US009697477B2

(12) United States Patent
Oh et al.

(10) Patent No.: US 9,697,477 B2
(45) Date of Patent: Jul. 4, 2017

(54) NON-FACTOID QUESTION-ANSWERING SYSTEM AND COMPUTER PROGRAM (71) Applicant: National Institute of Information and Communications Technology, Tokyo (JP)

(72) Inventors: Jonghoon Oh, Tokyo (JP); Kentaro Torisawa, Tokyo (JP); Chikara Hashimoto, Tokyo (JP); Takuya Kawada, Tokyo (JP); Stijn De Saeger, Tokyo (JP); Junichi Kazama, Tokyo (JP); Yiou Wang, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 408 days.

(21) Appl. No.: 14/377,999

(22) PCT Filed: Jan. 23, 2013

(86) PCT No.: PCT/JP2013/051327
§ 371 (c)(1),
(2) Date: Aug. 11, 2014

(87) PCT Pub. No.: WO2013/125286
PCT Pub. Date: Aug. 29, 2013

(65) Prior Publication Data
US 2015/0026106 A1     Jan. 22, 2015

(30) Foreign Application Priority Data
Feb. 23, 2012 (JP) ................................ 2012-036972

(51) Int. Cl.
*G06F 15/18* (2006.01)
*G06N 99/00* (2010.01)
(Continued)

(52) U.S. Cl.
CPC ....... *G06N 99/005* (2013.01); *G06F 17/2705* (2013.01); *G06F 17/3069* (2013.01);
(Continued)

(58) Field of Classification Search
USPC .......................................... 706/12
See application file for complete search history.

(56) References Cited

U.S. PATENT DOCUMENTS 8,543,565 B2 * 9/2013 Feng ................. G06F 17/30654
707/708
9,582,487 B2 * 2/2017 Hashimoto ......... G06F 17/2785
(Continued)

FOREIGN PATENT DOCUMENTS

| CN | 101872349 A | 10/2010 |
|---|---|---|
| JP | 2009-116662 A | 5/2009 |
| JP | 2009-157791 A | 7/2009 |

OTHER PUBLICATIONS

An effective approach for relevant paragraph retrieval in Question Answering systems Md Moinul Hogue; Paulo Quaresma 2015 18th International Conference on Computer and Information Technology (ICCIT) Year: 2015 pp. 44-49, DOI: 10.1109/ICCITechn.2015. 7488040 IEEE Conference Publications.*
(Continued)

*Primary Examiner* — Michael B Holmes
(74) *Attorney, Agent, or Firm* — Renner, Otto, Boisselle & Sklar, LLP (57) ABSTRACT In order to provide a non-factoid question answering system with improved precision, the question answering system (160) includes: a candidate retrieving unit (222), responsive to a question, extracting answer candidates from a corpus storage (178); a feature vector generating unit (232) for generating features from combinations of a question with each of the answer candidates; SVMs (176) trained to calculate a score of how correct a combination of the
(Continued)

question with an answer candidate is, upon receiving the feature vector therefor; and an answer ranker unit (234) outputting the answer candidate with the highest calculated score as the answer. The features are generated on the basis of the results of morphological analysis and parsing of the question, a phrase in the question evaluated as being positive or negative as well as its polarity, and the semantic classes of nouns in the features.

6 Claims, 8 Drawing Sheets

(51) Int. Cl.
    *G06F 17/30*     (2006.01)
    *G06F 17/27*     (2006.01)
    *G06N 7/00*     (2006.01)

(52) U.S. Cl.
    CPC .. *G06F 17/30598* (2013.01); *G06F 17/30654* (2013.01); *G06N 7/00* (2013.01)

(56) References Cited

U.S. PATENT DOCUMENTS

| | | | | |
|---|---|---|---|---|
| 2002/0138761 | A1* | 9/2002 | Kanemaki | G06F 21/33 726/7 |
| 2010/0299139 | A1 | 11/2010 | Ferrucci et al. | |
| 2015/0026106 | A1* | 1/2015 | Oh | G06F 17/3069 706/12 |
| 2015/0039296 | A1* | 2/2015 | Hashimoto | G06F 17/2785 704/9 |
| 2016/0140217 | A1* | 5/2016 | Sano | G06F 17/30654 706/12 |
| 2016/0155058 | A1* | 6/2016 | Oh | G06N 99/005 706/11 |
| 2016/0260026 | A1* | 9/2016 | Kloetzer | G06N 5/047 |
| 2016/0321244 | A1* | 11/2016 | Hashimoto | G06F 17/2785 |
| 2016/0328657 | A1* | 11/2016 | Hashimoto | G06F 17/2785 |
| 2016/0357854 | A1* | 12/2016 | Hashimoto | G06F 17/2785 |

OTHER PUBLICATIONS

Fuzzy linguistic multicriteria morphological analysis in scenario planning Pablo J. Villacorta; Antonio D. Masegosa; Maria T. Lamata 2013 Joint IFSA World Congress and NAFIPS Annual Meeting (IFSA/NAFIPS) Year: 2013 pp. 777-782, DOI: 10.1109/IFSA-NAFIPS.2013.6608499 IEEE Conference Publications.*
Morphological and statistical approach for boundary based shape representation methods M. Radhika Mani; G. P. S. Varma; P. Dakshina Murthy; Ch. Satyanarayana 2014 First International Conference on Networks & Soft Computing (ICNSC2014) Year: 2014 pp. 329-333, DOI: 10.1109/CNSC.2014.6906695 IEEE Conference Publications.*
An intelligent question answering conversational agent using Naïve Bayesian classifier M. Niranjan; M. S. Saipreethy; T. Gireesh Kumar 2012 IEEE International Conference on Technology Enhanced Education (ICTEE) Year: 2012 pp. 1-5, DOI: 10.1109/ICTEE.2012.6208614 IEEE Conference Publications.*
International Search report for corresponding International Application No. PCT/JP2013/051327 mailed Apr. 2, 2013.
Masaki Murata, Sachiyo Tsukawaki, Toshiyuki Kanamaru, Qing Ma, and Hitoshi Isahara, "A System for Answering Non-factoid Japanese Questions by Using Passage Retrieval Weighted Based on Type of Answer," In Proc. of NTCIR-6, 2007.
Ryuichiro Higashinaka and Hideki Isozaki, Corpus-based Question Answering for Why-Questions, In Proc. of IJCNLP, pp. 418-425, 2008.
Suzan Verberne, Lou Boves, Nelleke Oostdijk, and Peter-Arno Coppen, "What is not in the bag of words for why-qa?" Computational Linguistics, 36:229-245, 2010.
Mihai Surdeanu, Massimiliano Ciaramita, and Hugo Zaragoza, "Learning to rank answers to nonfactoid questions from web collections," Computational Linguistics, 37(2):351-383, 2011.
Tetsuji Nakagawa, Kentaro Inui, and Sadao Kurohashi, "Dependency Tree-based Sentiment Classification Using CRFs with Hidden Variables" In Proc. of Human Language Technologies: The 2010 Annual Conference of Computational Linguistics, pp. 786-794, Los Angeles, California, June. Association for Computational Linguistics.
Kyosuke Yoshida et al., "Introduction of a Probabilistic Language Model to Non-Factoid Question-Answering Using Examples of Q&A Pairs", IPSJ SIG Technical Report, May 17, 2011, vol. 2011-NL-201 No. 8; vol. 2011-SLP86 No. 8 and English abstract.

* cited by examiner

(Q1) Why does cancer occur?                    110

(A1-1) Carcinogens such as nitrosamine and benzo-
       pyrene may <u>increase the risk of cancer</u> by
       altering DNA in cells.            120

(A1-2) Maintaining a healthy weight may <u>lower the
       risk</u> of various types of cancer.
              122

Fig. 3

(A1-3) Trusting a specific food is n<u>ot effective</u>  140
       for preventing cancer, but maintaining a
       healthy weight may <u>help lower the risk of
       various types of cancer.</u>  142

| | |
|---|---|
| MSA1 | Morpheme n-grams, word phrase n-grams, and syntactic dependency n-grams in a question and its answer, where n ranges from 1 to 3. N-grams in a question and those in an answer are distinguished. |
| MSA2 | MSA1's n-grams in an answer candidate that contain a question term. |
| MSA3 | MSA1's n-grams that contain a clue term including riyuu (reason), gen' in (cause) and youin (cause). These n-grams in a question and those in an answer candidate are distinguished. |
| MSA4 | The ratio of the number of question terms in an answer candidate to the total number of question terms. |
| SWC1 | Word class n-grams in a question and its answer candidate. These n-grams in a question and those in an answer candidate are distinguished. |
| SWC2 | SA@W1's n-grams in an answer candidate whose original MSA1's n-grams contain any question term. |
| SA@W1 | Word polarity n-grams in a question and its answer candidate. These n-grams in a question and those in an answer candidate are distinguished. |
| SA@W2 | SA@W1's n-grams in an answer candidate whose original MSA1 n-grams contain any question term. |
| SA@W3 | Joint class-polarity n-grams in a question and its answer candidate. These n-grams in a question and those in an answer candidate are distinguished. |
| SA@W4 | SA@W1's n-grams in an answer candidates whose original MSA1 n-grams contain any question term. |
| SA@P1 | The indicator for polarity agreement between evaluation phrases, one in a question and the other in an answer candidate: 1 if any pair of such evaluation phrases has polarity in agreement, 0 otherwise. |
| SA@P2 | The phrase-polarity (positive or negative) of a pair of evaluation phrases for which the indicator in SA@P1 is 1. |
| SA@P3 | Morpheme n-grams, word phrase n-grams, and syntactic dependency n-grams in evaluation phrases are coupled with their phrase-polarity, where n ranges from 1 to 3. These n-grams in a question and those in an answer candidate are distinguished. |
| SA@P4 | SA@P3's n-grams in an answer candidates that contain a question term. |
| SA@P5 | The ratio of the number of question terms in sentences that have evaluation phrases in answer candidates to the total number of question terms. |
| SA@P6 | Word class n-grams in evaluation phrases are coupled with phrase-polarity. These n-grams in a question and those in an answer candidate are distinguished. |
| SA@P7 | SA@P6's n-grams in an answer candidates, whose original MSA1's n-grams include any question term. |
| SA@P8 | Joint class-polarity n-grams in evaluation phrases of a question and its answer candidate are coupled with phrase-polarity of the evaluation phrases. These n-grams in a question and those in an answer candidate are distinguished. |
| SA@P9 | SA@P8's n-grams in an answer candidates, whose original MSA1's n-grams include any question term. |
| SA@P10 | A pair of SA@P6's n-grams, one from evaluation phrases in a question and the other from those in an answer candidate, where the two evaluation phrases should have the same evaluation orientation. |

Fig. 9

Q1:Why does the increase of greenhouse gases such as carbon dioxide in the atmosphere lead to a rise of ocean level?

A1:···The burning of fossil fuels contributes to the increase of atmospheric concentrations of greenhouse gases and this makes the atmosphere absorb more thermal radiation. As a result, Earth's average surface temperature increases. This is global warming. ... There are warnings that the increase of sea water and melting of polar ice due to the global warming may cause sea-surface height to rise by 9-88 cm on average.  }280

Q2:Why does hemoglobin deficiency cause lack of oxygen in the human body?

A2:···Hemoglobin has an important role in the human body of carrying oxygen to the organs and transferring carbon dioxide back to the lungs, to be dispensed from the organism. If the amount of hemoglobin produced by the body is insufficient due to iron deficiency, the amount of oxygen delivered throughout the body decreases, causing oxygen deficiency.  }282

Fig. 10

| System | P@1 | MAP |
|---|---|---|
| B-QA | 0.254 (0.412) | 0.288 (0.467) |
| B-Ranker | 0.306 (0.497) | 0.341 (0.553) |
| Invention | 0.370 (0.600) | 0.370 (0.600) |
| Upper Bound | 0.616 (1) | 0.616 (1) |
| Retrieval-Oracle | 0.702 | 0.712 |

Fig. 11

| System | P@1 | MAP |
|---|---|---|
| SWC+S | 0.342 | 0.349 |
| MSA(B-Ranker) | 0.306 | 0.341 |
| MSA+SWC | 0.320 | 0.352 |
| MSA+SA@W | 0.323 | 0.353 |
| MSA+SA@P | 0.345 | 0.361 |
| MSA+SA | 0.353 | 0.366 |
| MSA+SWC+SA@W | 0.326 | 0.353 |
| MSA+SWC+SA@P | 0.358 | 0.368 |
| MSA+SWC+SA (Invention) | 0.370 | 0.370 |
| Upper Bound | 0.616 | 0.616 |

NON-FACTOID QUESTION-ANSWERING SYSTEM AND COMPUTER PROGRAM

TECHNICAL FIELD

The present invention relates to a question-answering system and, specifically, to a system for answering a so-called non-factoid questions such as how-to-questions and why-questions.

BACKGROUND ART

Question-answering (QA) research for questions related to some facts, so called factoid question, has recently achieved great success. It is still fresh in our memory that a system of this kind defeated human contestants in a quiz program in the United State. On factoid questions, its accuracy is reported to be about 85%. Researchers begin to recognize necessity of studying question-answering systems attaining similarly high accuracy in fields other than the factoid question-answering systems. Studies related to question-answering systems for non-factoid questions, such as "why" questions and "how to" questions, however, do not show substantial progress.

Non-Patent Literature 1 listed below discloses an example of such a system. In this system, a question and each of the sentences in a corpus are subjected to morphological analysis, and using the result of analysis, a score is calculated using document frequency of a term obtained from the question, frequency of occurrence of the term in each sentence, total number of documents and the length of documents. Then, a prescribed number of documents with higher scores are selected from the corpus. Paragraphs or one to three continuous paragraphs contained in the selected documents are answer candidates. Based on a score calculated mainly from terms in the question and terms contained in the answer candidates, an answer to the question is selected.

This system, however, is found to be unsatisfactory, as will be described later. Then, as an improvement over the system, a system described in Non-Patent Literature 2 has been proposed. According to this system, several answer candidates are selected by the technique described in Non-Patent Literature 1, and each of the answer candidates are re-ranked using prescribed scores.

In the following, a typical implementation of the system will be summarized based on the description of Non-Patent Literature 2. In the following, a question not related to a fact will be referred to as a "non-factoid question."

Figure 1:
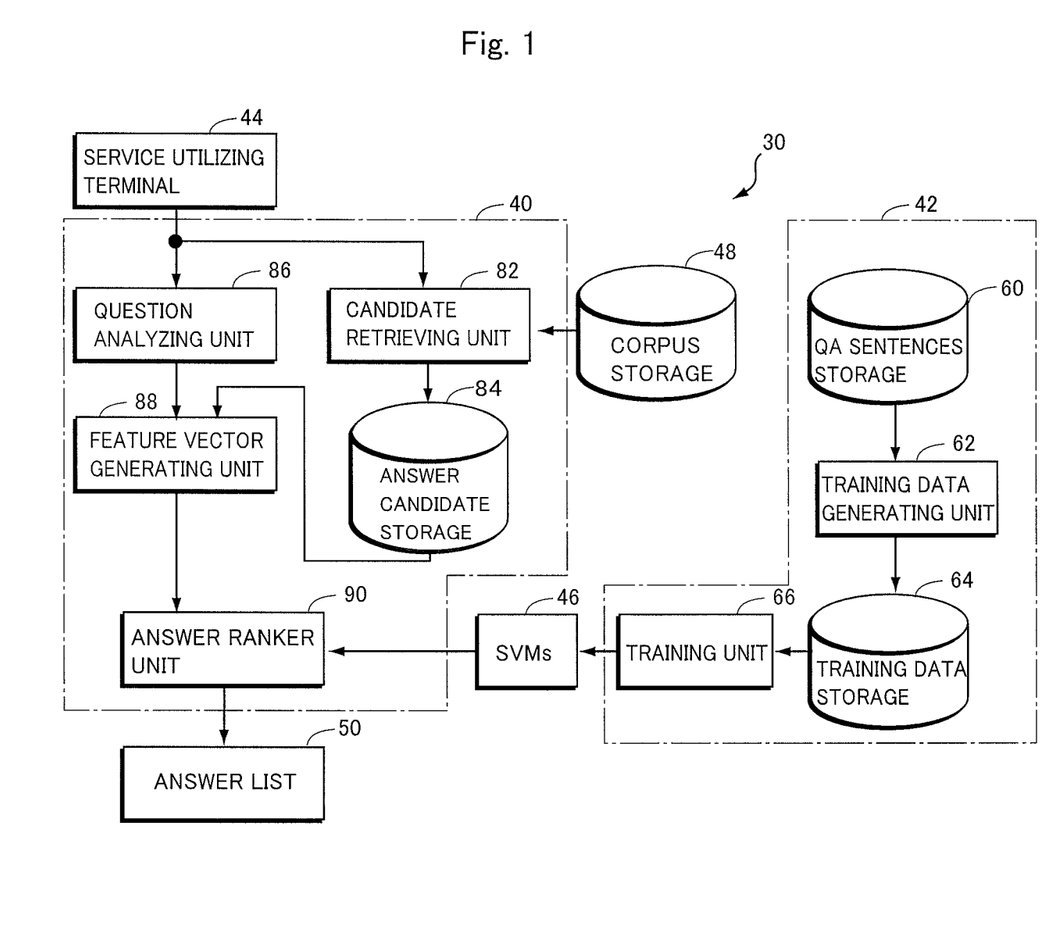
FIG. 1 is a block diagram showing a schematic configuration of a conventional non-factoid question-answering system.

Referring to FIG. 1, a question-answering system 30 stores corpus including a huge number of sentences (limited to Japanese here) that can be searched over the Internet in a corpus storage 48. The system receives a non-factoid question transmitted from a service utilizing terminal 44 capable of text communication such as a portable telephone, an answering unit 40 selects several sentences considered to be highly probable answers from among the huge number of sentences stored in the corpus storage 48, and the selected sentences are returned as an answer list 50, to service utilizing terminal 44. Answering unit 40 uses support vector machines (SVMs) 46 to rank the answer sentences, and a training unit 42 trains SVMs 46 in advance using supervised machine learning.

Training unit 42 includes: QA sentences storage 60 storing, in advance, Japanese QA sentences including non-factoid questions, correct or incorrect answers thereto, and flags indicating whether the answers are correct or not; a training data generating unit 62, analyzing QA sentences stored in QA sentences storage 60 and generating, as features to be used for training SVMs 46, training data including pre-selected various combinations of statistical information related to syntax and flags indicating whether an answer to each QA is a correct answer to the question; a training data storage 64 storing training data generated by training data generating unit 62; and a training unit 66 realizing supervised machine learning of SVMs 46 using the training data stored in training data storage 64. As a result of this training, SVMs 46 comes to output, when it receives features of the same type of combination as generated by training data generating unit 62, a measure indicating whether the combination of the question sentence and the answer candidate that caused the combination of features is a correct combination or not, namely, whether the answer candidate is the correct answer to the question.

It is assumed that each sentence stored in corpus storage 48 is subjected to the same analysis as conducted beforehand on each answer by training data generating unit 62, and that information necessary to generate the features to be applied to SVMs 46 is assigned to each sentence.

Answering unit 40 includes: a question analyzing unit 86, responsive to reception of a question sentence from service utilizing terminal 44, for performing predetermined grammatical analysis of the question sentence and outputting pieces of information (part of speech, conjugation, dependency structure and the like) necessary for generating features, for each word or term included in the question sentence; a candidate retrieving unit 82, responsive to reception of a question sentence from service utilizing terminal 44, for searching and extracting a prescribed number of (for example, 300) answer candidates to the question from corpus storage 48; and an answer candidate storage 84 for storing the prescribed number of candidates output from candidate retrieving unit 82 with grammatical information thereof.

Though candidates are searched and extracted from corpus storage 48 and stored in answer candidate storage 84 in this example, it is unnecessary to narrow down the candidates. By way of example, all sentences stored in corpus storage 48 may be regarded as the answer candidates. Here, what is required of candidate retrieving unit 82 is simply to have a function of reading all sentences stored in corpus storage 48, and what is required of answer candidate storage 84 is simply to have a function of temporarily storing the sentences read by candidate retrieving unit 82. Further, though question-answering system 30 locally holds corpus storage 48 in this example, it is not limiting. Corpus 48 may be remotely located, and it may be stored in not only one storage device but distributed and stored in a plurality of storage devices.

Answering unit 40 further includes: a feature vector generating unit 88 for generating feature vectors based on the combination of information output from question analyzing unit 86 and each of the answer candidates stored in answer candidate storage 84, and for applying the feature vectors to SVMs 46; and an answer ranker unit 90 applying the feature vectors given from feature vector generating unit 88 to the combinations of the question sentence and each of the answer candidates and, based on the results eventually output from SVMs 46, ranking each of the answers stored in answer candidate storage 84, and outputting a prescribed number of answer candidates higher in rank as an answer list 50. Typically, a basic function of SVMs 46 is to mathematically find a hyper plane for classifying objects to two classes and to output the results as positive/negative polarity information. It is noted, however, that the SVMs can also output a distance from the hyper plane to the point defined by an input. The distance is considered to represent appropriateness of an answer and, therefore, answer ranker unit 90 uses a combination of the distance and the polarity information output from SVMs 46 as a score of the answer candidate.

In this question-answering system 30, a large number of combinations of a question and sentences as positive examples appropriate as answers to the question, and a large number of combinations of the question and sentences as negative examples incorrect as answers to the question are stored in advance in QA sentences storage 60. A flag indicating whether the answer is correct or not is manually added to each combination. Training data generating unit 62 generates training data for training SVMs 46 from these combinations, and stores the data in training data storage 64. Using the training data stored in training data storage 64, training unit 66 trains SVMs 46. As a result of this process, SVMs 46 acquires the ability to output, when it receives a combination of features of the same type as generated by training data generating unit 62, a value indicating whether the combination of source sentences (question and answer candidate) is corrector not, or a value indicating degree of correctness of the answer candidate to the question.

On the other hand, a corpus including a large number of sentences is stored in corpus storage 48. Each sentence has been subjected to the same type of analysis as conducted by training data generating unit 62, and each sentence has information for ranking the answer candidates, similar to part of the training data, assigned thereto. Upon receiving a question sentence from service utilizing terminal 44, candidate retrieving unit 82 performs a known candidate retrieving process and extracts a prescribed number of answer candidates to the question sentence from corpus storage 48. The answer candidates extracted by candidate retrieving unit 82 are stored, together with the information for ranking the answer candidates, in answer candidate storage 84.

On the other hand, question analyzing unit 86 performs a prescribed analysis on the question sentence, and thereby generates information necessary to generate features, and applies it to feature vector generating unit 88. Upon receiving the information from question analyzing unit 86, feature vector generating unit 88 combines this with the information for ranking answer candidates of each answer candidate stored in answer candidate storage 84, and thereby generates feature vectors having the same configuration as the training data generated by training data generating unit 62 (without the flag indicating if the answer candidate is correct or not), and applies the feature vectors to answer ranker unit 90.

Answer ranker unit 90 applies the feature vectors obtained from the combination of each answer candidate and the question sentence applied from feature vector generating unit 88 to SVMs 46. For the applied feature vectors of each of the combinations, SVMs 46 outputs a score indicating how appropriate the answer candidate in the combination is for the question in the combination. Answer ranker unit 90 sorts combinations of the question and each answer candidate in descending order of the score, and returns a prescribed number of answer candidates higher in rank in the form of an answer list 50 to the question applied from service utilizing terminal 44, to service utilizing terminal 44.

CITATION LIST

Non Patent Literature

NPL 1: Masaki Murata, Sachiyo Tsukawaki, Toshiyuki Kanamaru, Qing Ma, and Hitoshi Isahara, "A System for Answering Non-factoid Japanese Questions by Using Passage Retrieval Weighted Based on Type of Answer," In Proc. of NTCIR-6.

NPL 2: Ryuichiro Higashinaka and Hideki Isozaki, "Corpus-based Question Answering for Why-Questions, In Proc. of IJCNLP, pp. 418-425.

NPL 3: Tetsuji Nakagawa, Kentaro Inui and Sadao Kurohashi, "Dependency Tree-based Sentiment Classification Using CRFs with Hidden Variables" In Proc. of Human Language Technologies: The 2010 Annual Conference of Computational Linguistics, Pp. 786-794, Los Angeles, Calif., June. Association for Computational Linguistics.

SUMMARY OF INVENTION

Technical Problem

It has been found that the system according to Non-Patent Literature 1 attains less-than-satisfactory performance. Particularly, the performance of non-factoid question-answering system remains considerably lower than that of factoid question-answering systems, and improved performance of non-factoid question-answering systems has been desired. In the future, it will become necessary not only to handle simple questions related to facts but also to find the reason of some event or to infer a consequence from some event.

Therefore, an object of the present invention is to provide a question-answering system enabling higher accuracy in answering non-factoid questions such as why or how-to questions.

Solution to Problem

According to a first aspect, the present invention provides a non-factoid question-answering system, receiving an input of a non-factoid question and generating an answer to the question. The system is to be connected to corpus storage means for storing a corpus composed of computer-readable documents of a language as an object of processing. The system includes: candidate retrieving means, responsive to an input of a question, for searching and extracting a plurality of answer candidates to the question from the corpus storage means; feature generating means, responsive to an input of a question, for generating prescribed features for combinations of the question and each of the answer candidates stored in the candidate retrieving means; scoring means trained in advance to calculate, upon receiving features generated by the feature generating means from a combination of an answer candidate and a question, a score indicating degree of an answer candidate in the combination being a correct answer to the question in the combination; and answer selecting means for outputting, based on the scores calculated by the scoring means for the combinations of the question and each of the answer candidates stored in the answer candidates, an answer candidate having the highest probability of being a correct answer to the question as an answer to the question. Each of the answer candidates retrieved by the candidate retrieving means has assigned thereto information necessary for the feature generating means to generate the feature. The feature generating means includes: parsing means for performing morphological analysis and parsing on the question and outputting morphological information and syntactic information; and evaluating means for specifying, from the question, a phrase classified to a first evaluation class and a phrase classified to a second evaluation class, in accordance with a certain evaluation reference. The first and second evaluation classes have assigned thereto mutually opposite evaluation polarities. The question-answering system further includes feature generating means for generating the features, for the combinations of the question and each of the answer candidates, based on the result of analysis by the parsing means, locations of phrases specified by the evaluating means and their evaluation class polarities, and the information for generating features assigned to the answer candidate.

Preferably, the feature generating means further includes semantic class converting means for classifying each noun included in the output from the parsing means to any of a plurality of semantic word classes prepared in advance, and converting the noun to its corresponding semantic class. The feature generating means includes first means for generating the features, for the combinations of the question and each of the answer candidates, based on the result of analysis by the parsing means, locations of phrases specified by the evaluating means and their evaluation class polarities, an output of the parsing means after conversion by the semantic class converting means, and the information for generating features assigned to the answer candidate.

The feature generated by the first means based on the locations of phrases specified by the evaluating means and their evaluation class polarities may include information indicating whether or not the evaluation class polarity of a phrase in the question agrees with the evaluation class polarity of a phrase in the answer candidate.

More preferably, the feature generated by the first means based on the locations of phrases specified by the evaluating means and their evaluation class polarities further includes, when the evaluation class polarity of a phrase in the question agrees with the evaluation class polarity of a phrase in the answer candidate, information indicating the polarity.

The feature generated by the first means may include a feature obtained from the output of the parsing means not using the output of the evaluating means or the output from the semantic class converting means, a feature obtained by combining the output of the parsing means with the output of the evaluating means, and a feature obtained by combining the output of the parsing means with the output of the semantic class converting means.

Alternatively, the feature generated by the first means may include a feature obtained by combining the output of the parsing means with the output of the evaluating means, and further with the output of the semantic class converting means.

According to a second aspect, the present invention provides a computer program realizing, by a computer, a non-factoid question-answering system, receiving an input of a non-factoid question and generating an answer to the question. The computer is connected to corpus storage means for storing a corpus composed of computer-readable documents of a language as an object of processing. The computer program according to the second aspect causes the computer to function as: candidate retrieving means, responsive to an input of a question, for searching and extracting a plurality of answer candidates to the question from the corpus storage means; feature generating means, responsive to an input of a question, for generating prescribed features for combinations of the question and each of the answer candidates stored in the candidate retrieving means; scoring means trained in advance to calculate, upon receiving features generated by the feature generating means from a combination of an answer candidate and a question, a score indicating degree of an answer candidate in the combination being a correct answer to the question in the combination; and answer selecting means for outputting, based on the scores calculated by the scoring means for the combinations of the question and each of the answer candidates stored in the answer candidates, an answer candidate having the highest probability of a correct answer to the question as an answer to the question. Each of the answer candidates retrieved by the candidate retrieving means has assigned thereto information necessary for the feature generating means to generate the feature. A program part causing the computer to function as the feature generating means causes the computer to function as parsing means for performing morphological analysis and parsing on the question and outputting morphological information and syntactic information, and evaluating means for specifying, from the question, a phrase classified to a first evaluation class and a phrase classified to a second evaluation class, in accordance with a certain evaluation reference. The computer program further causes the computer to function as feature generating means for generating the features, for the combinations of the question and each of the answer candidates, based on the result of analysis by the parsing means, locations of phrases specified by the evaluating means and their evaluation class polarities, and the information for generating features assigned to the answer candidate.

BRIEF DESCRIPTION OF DRAWINGS

FIG. 8 shows, in the form of a table, a list of features used in the question-answering system in accordance with an embodiment of the present invention.

DESCRIPTION OF EMBODIMENTS

In the following description and in the drawings, the same components are denoted by the same reference characters. Therefore, detailed descriptions thereof will not be repeated.

Introduction

The inventors of present invention noticed that non-factoid questions and their answers often have the following tendency:

If something undesirable happens, the reason is often also something undesirable; and If something desirable happens, the reason is often also something desirable.

The present invention is based on this tendency as a first hypothesis.

Figure 2:
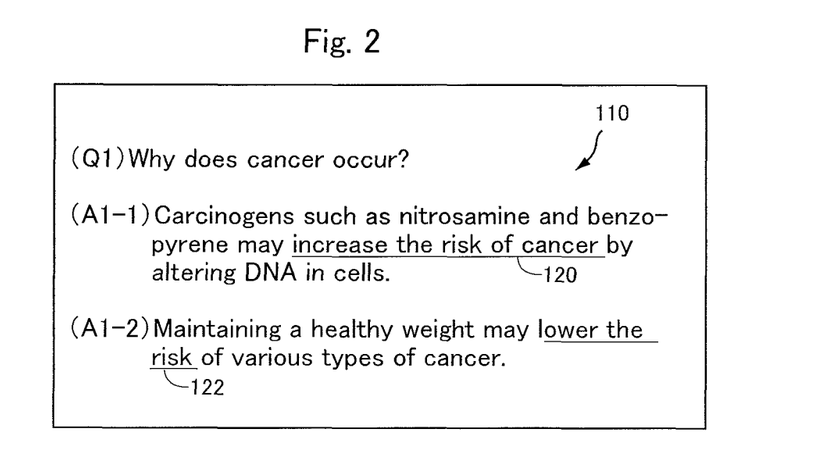
FIG. 2 shows examples of non-factoid question and answer candidates thereto.

By way of example, let us consider a combination 110 of a question Q1 such as shown in FIG. 2 and answer candidates A1-1 and A1-2. The underlined portion 120 of answer candidate A1-1 describes an undesirable event related to cancer, while the underlined portion 122 of answer candidate A1-2 describes desirable action for preventing cancer. According to the present invention, answer candidate A1-1 is assumed to be more appropriate as an answer to question Q1. For simplicity of description, in the present specification, the orientations of evaluation such as "desirable" and "undesirable" are referred to as "polarities" and phrases to be evaluated with polarities such as "a phrase describing a desirable event" and "a phrase describing an undesirable event" are referred to as "evaluation phrases." Specifically, in the present invention, a phrase is classified either to a first evaluation class of "a phrase describing a desirable event" or to a second evaluation class of "a phrase describing an undesirable event," in accordance with a certain standard of evaluation. Mutually opposite polarities such as "desirable" and "undesirable" are assigned to the evaluation classes. Though the polarities "desirable/undesirable" are discussed here, various other polarities may be possible, in accordance with the standards of evaluation used. For example, polarities such as "increase/decrease", "active/inactive", "taste good/bad", "upgrade/downgrade", "accept/reject", "happy/unhappy" may be possible.

The present invention is also based on a second hypothesis that there are often significant associations between the lexco-semantic classes of words in a question and those in its answer sentence. For instance, questions concerning diseases like question Q1 shown in FIG. 2 often have answers that include references to chemicals (like answer candidate A1-1), viruses, body parts and so on. Capturing such statistical correlations between diseases and harmful substances may lead to higher possibility of providing more appropriate answers to the questions. For this purpose, in the embodiment below, semantically similar words are classified into semantic classes, which are used as features. Though semantic classes can be manually built and existing semantic thesauruses are also available, in the present embodiment, word classes automatically acquired from a large web corpus using an EM-based method are used. Details of the method can be found in Kazama and Torisawa, "Inducing Gazetteers for Named Entity Recognition by Large-scale Clustering of Dependency Relations" (http://http://www.aclweb.org/anthology-new/P/P08/P08-1047.pdf).

Another issue is that some answer candidates may contain multiple phrases of different polarities.

Figure 3:
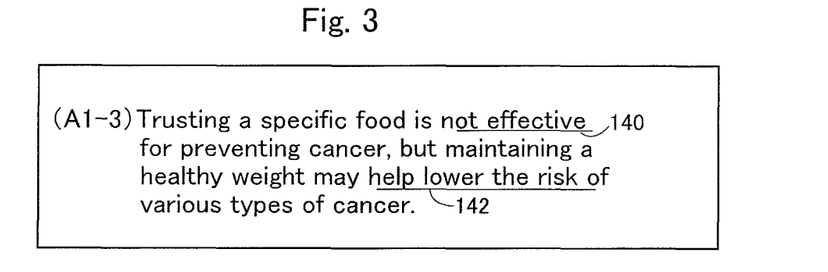
FIG. 3 shows an example of an answer candidate to a non-factoid question.

For example, FIG. 3 shows an answer candidate A1-3, similar to answer candidate A1-2 shown in FIG. 2. The answer candidate A1-3 shown in FIG. 3 includes an undesirable evaluation phrase 140 related to cancer and a desirable evaluation phrase 142 related to cancer. Here, there arises a problem that which of answer candidates A1-1 shown in FIG. 2 and A1-3 shown in FIG. 3 should be adopted as the answer to question Q1 shown in FIG. 2. To address this problem, in the present invention, we use the combination of evaluation polarity and the contents of evaluation phrases connected to the polarity, both in the question and the answer candidates.

To deal with data sparseness problem arising in using the contents of evaluation phrases in statistical processing, we developed a feature set that combines the evaluation polarity and the semantic word classes effectively. By supervised learning using such feature set, a classifier that scores answer candidates to a non-factoid question was trained. Results of experiments will be discussed later.

[Configuration]

Figure 4:
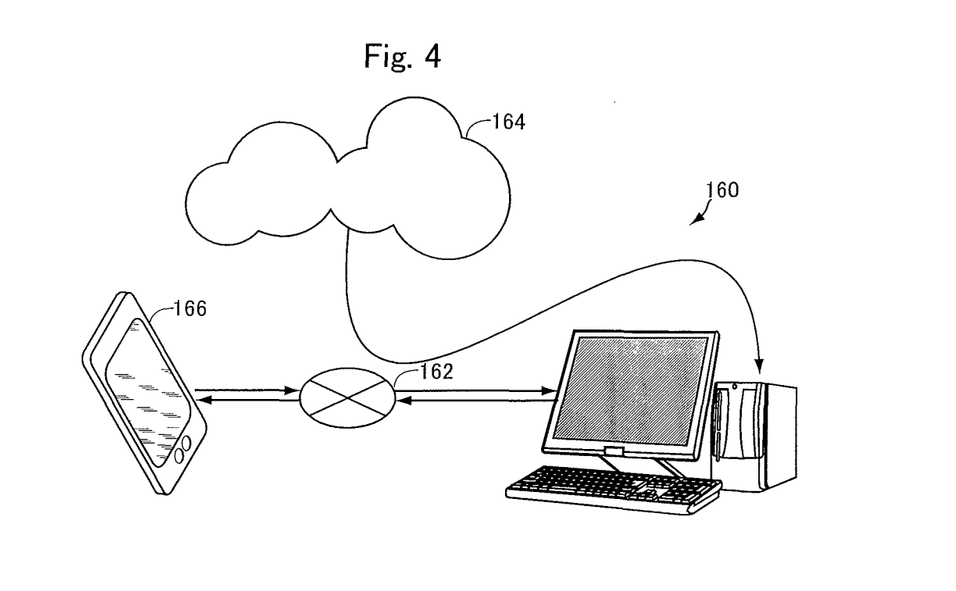
FIG. 4 illustrates a situation where the question-answering system in accordance with an embodiment of the present invention is used.

Referring to FIG. 4, in a non-factoid question answering system 160 in accordance with the present embodiment, a document set 164 of huge amount of documents on the Internet is acquired in advance, and in response to a non-factoid question received from a service utilizing terminal 166 through the Internet 162, a list of answers appropriate for the question is generated from the stored document set 164, and the list is returned to service utilizing terminal 166. In the present embodiment, the question from service utilizing terminal 166 is transmitted as a web form input data, to non-factoid question-answering system 160.

Figure 5:
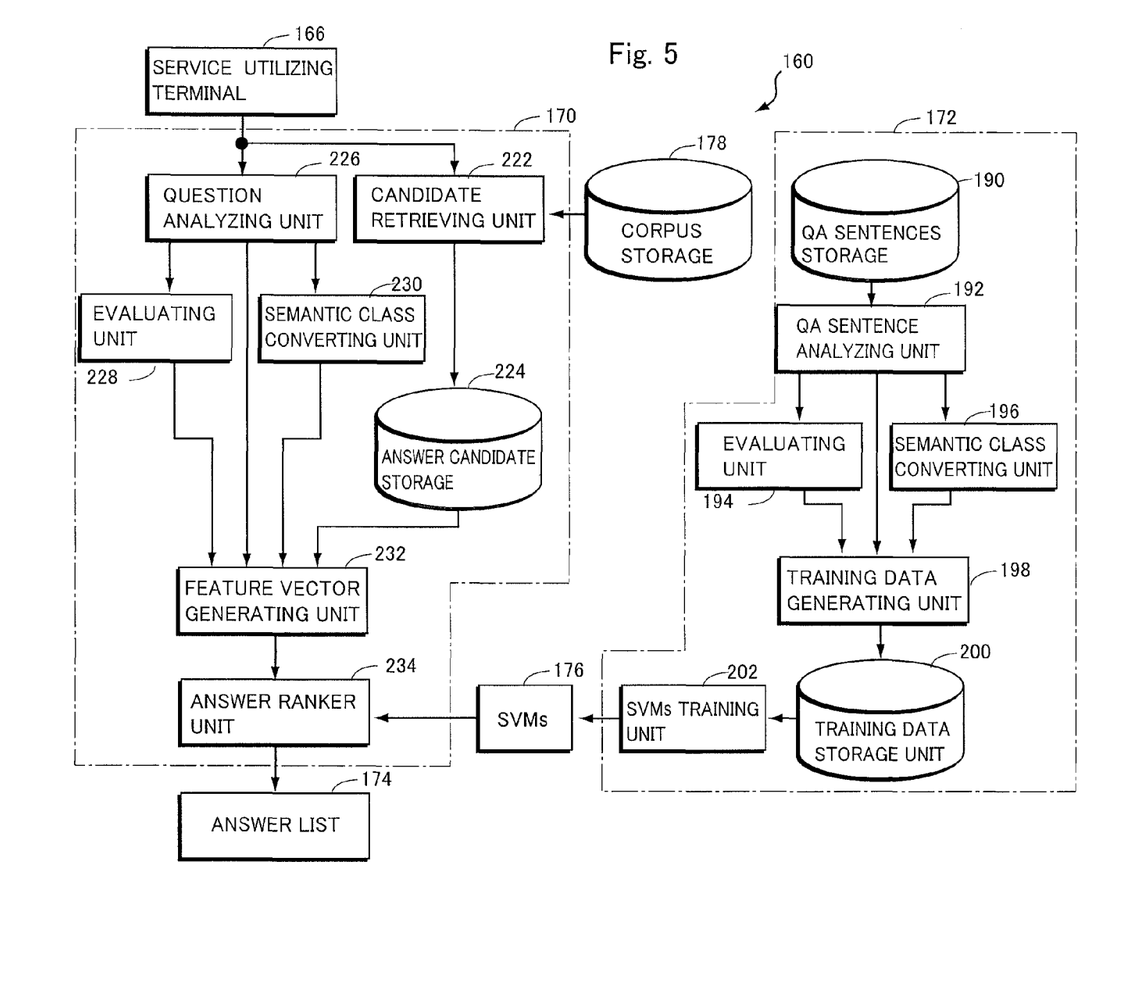
FIG. 5 is a block diagram of the question-answering system in accordance with an embodiment of the present invention.

Referring to FIG. 5, question-answering system 160 includes: a corpus storage 178 for storing the document set 164, which is a document set of huge amount of documents on the Internet acquired in advance, with information necessary for forming features to rank answer candidates assigned to each sentence; an answering unit 170 responsive to the question received from service utilizing terminal 166, for extracting several sentences stored in corpus storage 178 as appropriate answers to the received question, ranking these sentences and outputting an answer list 174 having a prescribed number of answers higher in rank listed to service utilizing terminal 166; SVMs 176 used by answering unit 170 for ranking the answer candidates; and a training unit 172 for supervised machine learning of SVMs 176 using training data prepared in advance, so that SVMs 176 acquires the ability to output, when a combination of pre-determined features obtained from the combination of a question and an answer is received, a score indicating whether the answer in the combination is a correct answer to the question in the combination, and further indicating the probability that the answer is correct.

Answering unit 170 includes: a candidate retrieving unit 222, responsive to a question received from service utilizing terminal 166, for searching corpus storage 178 in a conventional manner and extracting a prescribed number of (for example, 300) answer candidates from a huge number of sentences; an answer candidate storage 224 for storing candidates extracted by candidate retrieving unit 222; a question analyzing unit 226, responsive to a question received from service utilizing terminal 166, for analyzing the question, or conducting morphological analysis and parsing (syntactic analysis) to be used for features, and outputting morphological information and syntactic information; a semantic class converting unit 230 for estimating a semantic class of the information output from question analyzing unit 226 by applying a prescribed statistical probability model on words, and outputting the words with information representing the semantic class added thereto; and an evaluating unit 228 evaluating the outputs of question analyzing unit 226, determining evaluation phrases and their polarities as described above, and outputting the results phrase by phrase.

Though not shown, each sentence of the documents stored in corpus storage 178 is subjected to the same processes as those conducted by question analyzing unit 226, evaluating unit 228 and semantic class converting unit 230 in advance. By this approach, the amount of subsequent processing for generating feature vectors from the pairs of question and answer candidates can be reduced.

Answering unit 170 further includes: a feature vector generating unit 232, receiving outputs from question analyzing unit 226, evaluating unit 228 and semantic class converting unit 230, reading each answer candidate and accompanying information from answer candidate storage 224 and generating feature vectors to be applied to SVMs 176 based on the pieces of information of both the question and the answer candidates; and an answer ranker unit 234, applying the feature vectors output from feature vector generating unit 232 of each answer candidate to SVMs 176, and based on scores thus obtained from SVMs 176, ranking answer candidates, forming answer list 174 containing a prescribed number of answer candidates higher in rank, and returning the list to service utilizing terminal 166.

Training unit 172 includes: a QA sentences storage 190 for storing a large number of QA sentences together with flags indicating whether each combination is correct or not; a QA sentence analyzing unit 192 for performing processes similar to those conducted by question analyzing unit 226, on each combination of question and answer candidate stored in QA sentences storage 190; a semantic class converting unit 196 for adding semantic class information by using statistical model, to each word in the outputs of QA sentence analyzing unit 192; an evaluating unit 194 evaluating the question and each of the answers of QA sentences, and outputting the question and answers having tags representing evaluation phrases and their polarities added thereto; a training data generating unit 198, combining pieces of information output from QA sentence analyzing unit 192, evaluating unit 194 and semantic class converting unit 196 to generate and output training data (feature vectors) for training SVMs 176; a training data storage 200 for storing training data output from training data generating unit 198; and SVMs training unit 202 for conducting supervised machine learning on SVMs 176, using the training data stored in training data storage 200.

In the present embodiment, 600-million documents in Japanese were collected from the Internet and stored in corpus storage 178.

(Extraction of Answer Candidates)

In the present embodiment, Solr distributed from http://lucene.apache.org/solr is used as candidate retrieving unit 222. In the present embodiment, candidate retrieving unit 222 is adjusted to extract, for one question, a prescribed number of (for example, 300) documents in the order of higher possibility of containing the answer, from 600-milion documents stored in corpus storage 178. Further, each candidate is split into a set of answer candidates consisting of five consecutive sentences. In order to avoid errors due to wrong document segmentation, the split documents are allowed to share up to two sentences.

In candidate retrieving unit 222, each of the answer candidates ac obtained in this manner for the question q is scored according to scoring function S (q, ac) as specified by Equation (1) below. In the present embodiment, for extraction, answer candidates containing terms from the question with additional three clue terms referring to causal relation (RIYUU ("reason" in Japanese), GEN'IN ("cause"), and YOUIN ("cause")) are looked for. Candidate retrieving unit 222 selects 300 answer candidates for the question in accordance with the ranks determined by Equation (1), and stores these in answer candidate storage 224, from which the candidates are applied to answer ranker unit 234.

The scoring function S given by Equation (1) assigns a score to each answer candidate like tf (logarithmic term frequency)–idf (inverse document frequency). In Equation (1), $1/dist(t_1,t_2)$ serves as tf, and $1/df(t_2)$ is idf for given $t_1$ and $t_2$ shared by the question q and the answer candidate ac.

[Equation 1]

$$S(q, ac) = \max_{t1 \in T} \sum_{t2 \in T} \phi \times \log(ts(t_1, t_2)) \quad (1)$$

$$ts(t_1, t_2) = \frac{N}{2 \times dis(t_1, t_2) \times df(t_2)}$$

Here, T is a set of terms including nouns, verbs and adjectives in question q that appear in answer candidate ac. Note that the clue terms are added to T if they exist in answer candidate ac. N is the total number of documents (600 million), and dist(t1,t2) represents the distance (the number of characters) between terms $t_1$ and $t_2$ in answer candidate ac. Further, df(t) is the document frequency of term t, and $\phi \in \{0, 1\}$ is an indicator where $\phi=1$ if ts(t1,t2)>1 and $\phi=0$ otherwise.

(Ranking of Answer Candidates)

As described above, a supervised classifier (SVMs) that uses three different types of features sets is used for the ranking. The feature sets include: (1) features expressing results of morphological and syntactic analysis of questions and answer candidates (denoted as "MSA"); (2) features representing semantic word classes appearing in questions and answer candidates (denoted as "SWC"); and (3) features representing the results of evaluation/analysis (denoted as "SA").

<<MSA>>

MSA has been widely used for re-ranking answer candidates. This feature is used to identify associations between questions and answers at the morpheme, word phrase and syntactic dependency levels.

All sentences included in a question and its answer candidate are represented in three ways; as a bag of morphemes, a bag of word phrases and a bag of syntactic dependency chains. These can be obtained using a morphological analyzer program (for example, http://nlp.ist.i.kyoto-u.ac.jp/index.php?JUMAN) and a dependency parser program (for example, http://nlp.ist.i.kyoto-u.ac.jp/index.php?KNP).

Figure 6:
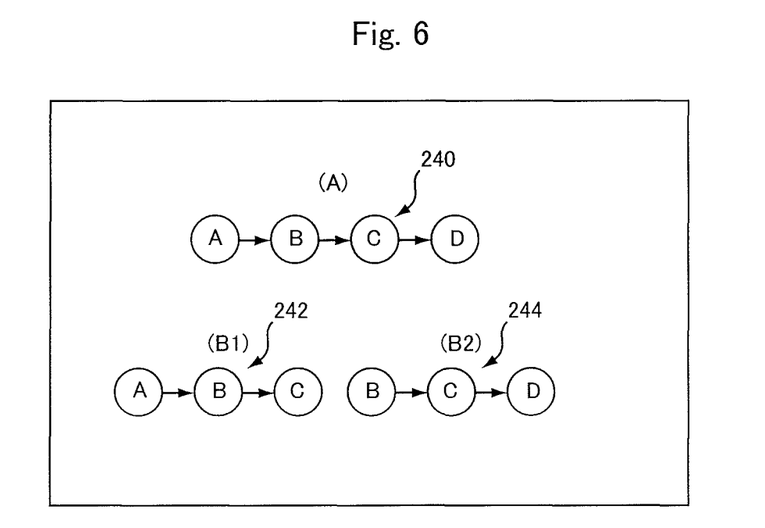
FIG. 6 is a schematic illustration showing an n-gram configuration.

In the present embodiment, from each question and answer candidate, morpheme, word phrase and syntactic dependency n-gram (n=1 to 3) are extracted. Assume, for example, that a sentence includes a portion 240 consisting of four consecutive word phrases A, B, C and D, as shown in FIG. 6 (A). The word phrase 3-gram obtained from these four word phrases are: 3-gram 242 consisting of word phrases A, B and C shown in FIG. 6 (B1), and a 3-gram 244 consisting of word phrases B, C and D shown in (B2).

Figure 7:
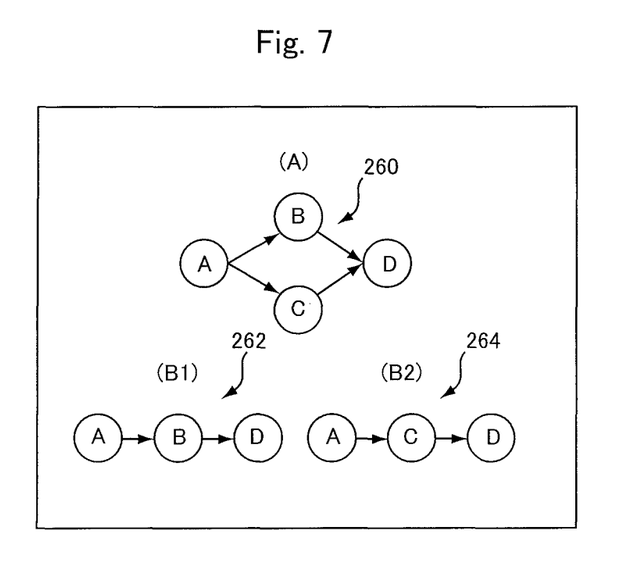
FIG. 7 illustrates an n-gram configuration depending on a syntactic structure.

In contrast, syntactic dependency n-grams are defined as a path containing three consecutive word phrases in a network of syntactic dependency. By way of example, consider a syntactic dependency network 260 such as shown in FIG. 7(A) is acquired. Assuming that 3-grams are extracted from the network 260. Here, 3-gram 262 consisting of word phrases A, B and C shown in FIG. 7(B1) and a 3-gram 264 consisting of word phrases A, C and D shown in FIG. 7(B2) are obtained. When compared with FIG. 6, the difference is apparent. Syntactic dependency 1-grams coincide with word phrase 1-grams, so they are ignored.

As MSA, four types of features MSA1 to MSA4 at 270 of the table shown in FIG. 8 can be used. Descriptions thereof are as shown in FIG. 8 and, therefore, individual description will not be repeated here. It is noted that MSA2 contains n-grams including a term from a question, such as "types of cancer" in the example of FIG. 2.

<<SWC>>

Semantic word classes are sets of semantically similar words. In the present embodiment, such semantic word classes are constructed using the noun clustering technique described in Kazama and Torisawa. The algorithm described in this reference follows a hypothesis that semantically similar words tend to appear in similar contexts. By treating syntactic dependency relations between words as contexts, the method defines a probabilistic model of non-verb dependencies with hidden classes as represented by Equation (2) below.

[Equation 2]

$$p(n,v,r)=\Sigma p(n|c)p(\langle v,r \rangle|c)p(c) \quad (2)$$

Here, n is a noun, v is a verb or noun on which n depends via a grammatical relation r (post-positions in Japanese), and c is a hidden class. Dependency relations frequencies were obtained from the corpus of 600-million sentences. Model parameters $p(n|c)$, $p(\langle v, r \rangle|c)$ and $p(c)$ were estimated using the EM algorithm. By this technique, 5.5 million nouns were successfully clustered into 500 classes. For each noun n, EM clustering estimates a probability distribution over hidden variables representing semantic classes. From this distribution, a class c attaining $c=\text{argmax}_c p(c^*|n)$ is assigned to each noun n. As a result, clean semantic classes such as chemicals, nutrients, diseases and so on could be obtained.

SWC is for reflecting association between a word in the question and a word in an answer candidate. Assume that the training data contains a question having a word of specific semantic class and an answer candidate having a word of the specific semantic class and that the relation between them is positive (that is, the answer candidate represents a correct answer to the question). If a word of the same class as the question in the training data exists in a question, if other conditions are equal, the SVMs will select an answer candidate having a word of the same semantic class as the specific semantic class among the answers in the training data as the answer to the question.

The same process could be considered on word level, rather than the semantic level of words. Specifically, association on specific word level may be statistically modeled. In that case, however, word level associations are too specific and because of data sparseness, it is difficult to generalize the model and to increase model reliability.

A shown in FIG. 8, two types of SWC, SWC1 and SWC2 are used. Descriptions of these can be found in FIG. 8.

The procedure to obtain SWC1 is as follows. First, all nouns in the MSA1 n-grams are converted to respective semantic classes and, n-grams that contain at least one semantic word class are used as SWC1.

SWC2 represents n-grams in an answer candidate, in which words that exist in the question are replaced by their respective semantic classes.

These features capture the correspondence between semantic word classes in the question and the answer candidates.

<<SA>>

SA features are further divided into two. The first is evaluation analysis at the word level (word polarity), and these are represented as SA@W1 to SA@W4 in FIG. 8. The second is evaluation analysis at the phrase level (phrase-polarity). These are represented as SA@P1 to SA@P10 in FIG. 8.

(1) Word Polarity (SA@W)

The word polarities are determined by dictionary-look-up of a word polarity orientation lexicon prepared in advance. In the present embodiment, a lexicon generated by a tool program proposed in Non-Patent Literature 3 is used. These features identify associations between the polarity of words in a question and that in a correct answer. From the hypothesis, it is expected that, as a result of training, the polarities of words in the selected answer more likely come to have the same polarities of words in a question.

SA@W1 and SA@W2 shown in FIG. 8 are evaluation analysis features from word polarity n-grams, which contain at least one word that has word polarities. These n-grams are obtained by converting all nouns in MSA1 n-grams into their word polarities through dictionary look-up. SA@W1 is concerned with all word polarity n-grams in the questions and answer candidates. For SA@W2, word polarity n-grams from SA@W1 are restricted to those whose original n-grams include a question term.

Further more, word polarities are coupled with semantic word classes so that the classifier can identify meaningful combinations of both. By way of example, a word with a negative polarity and having the semantic class of "condition" may represent an "undesirable condition." As a result, the classifier learns correlation between words expressing negative conditions and their connection to questions asking about diseases. SA@W3 and SA@W4 are features of this type. These are defined in the same way as SA@W1 and SA@W2, except that word polarities in SA@W1 and SA@W2 are replaced with the combination of semantic word classes and word polarities. The n-grams in SA@W3 and SA@W4 are referred to as joint (word) class-polarity n-grams.

(2) Phrase Polarity (SA@P)

In the present embodiment, evaluation phrases are extracted and their polarities are determined using an existing tool program (according to Non-Patent Literature 3). Experimental results show that evaluation phrases do not help to identify correct answers if the evaluation phrases do not have any term from the question. Therefore, in the present embodiment, we used only the evaluation phrases acquired from sentences containing at least one question term, for generating phrase polarity features.

As the features related to phrase polarities, roughly three categories of features are used. The first category includes SA@P1 and SA@P2 shown in FIG. 8. The second category includes SA@P3 to SA@P5 shown in FIG. 8. The third category includes SA@P6 to SA@P10.

The features of the first category are concerned with phrase-polarity agreement between evaluation phrases in a question and its answer candidate. All possible pairs of evaluation phrases from the question and answer are considered. If any such pair agrees in polarity, an indicator for the agreement and its polarity become the features SA@P1 and SA@P2, respectively.

The features of the second category come from the hypothesis that evaluation phrases often represent the core part of the correct answer. It is necessary to use features expressing the contents of evaluation phrases. SA@P3 to SA@P5 of FIG. 8 are devised for this purpose. Contents of these features are as shown in FIG. 8.

The features of the third category use semantic word classes to generalize the content features of question or answer described above. As can be seen from FIG. 8, these features consist of word class n-grams and joint class-polarity n-grams taken from evaluation phrases, together with their phrase polarities. Contents of these features are as shown in FIG. 8.

[Operation]

The operation of non-factoid question-answering system 160 in accordance with the present embodiment described above basically follows the same steps as the conventional example shown in FIG. 1, specifically, training of SVMs 176 and processing of question by answering unit 170. Prior to these steps, the evaluation tool and lexicon used by evaluating unit 194 and the statistical probability model to be used in semantic class converting unit 196 must be prepared. The probability model is in accordance with Equation (2). In addition, huge number of sentences are collected and stored in corpus storage 178. As already described, pieces of information necessary for feature vector generating unit 232 to generate features are prepared and added to each sentence. On the other hand, a plurality of combinations (QA sentences) of questions and answers prepared by hand are stored in QA sentences storage 190. Each combination consists of a question and its correct answer. For the combinations of questions and answers, as many different types of questions as possible should desirably be used. For this purpose, ideally, QA sentences should be prepared by as many people as possible. Practically, however, the number of participants is generally limited and, in this point, there is inevitably a constraint on the system.

Next, QA sentence analyzing unit 192 conducts morphological analysis, parsing and the like on each of the QA sentences, and applies QA sentences having resulting information representing part of speech, dependency and the like assigned thereto, to evaluating unit 194, semantic class converting unit 196 and training data generating unit 198.

Evaluating unit 194 searches for evaluation phrases in each question and each answer of each of the given QA sentences, adds tags indicating positions and polarities corresponding to the evaluation phrases to the questions and answers, and applies the results to training data generating unit 198. Semantic class converting unit 196 converts nouns in each of the given QA sentences to semantic word classes, and applies the results to training data generating unit 198.

For each QA sentence, based on the morphological and syntactic information from QA sentence analyzing unit 192, information related to evaluation from evaluating unit 194 and information related to semantic class from semantic class converting unit 196, training data generating unit 198 generates various features shown in FIG. 8, adds a flag assigned to each QA sentence (the flag indicating whether the answer is appropriate for the question) and thereby generates training data, and stores the data in training data storage 200.

SVMs training unit 202 trains SVMs 176 using the training data stored in training data storage 200. The trained SVMs 176 is ready for use by answer ranker unit 234.

<<Answer Retrieval>>

SVMs 176 incorporated in answer ranker unit 234 enables answer processing by answering unit 170. When service utilizing terminal 166 transmits a question to answering unit 170, question analyzing unit 226 and candidate retrieving unit 222 receive the question.

Receiving the question, candidate retrieving unit 222 retrieves 300 answer candidates higher in rank as highly probable answer candidates from among huge number of sentences stored in corpus storage 178, and outputs these to answer candidate storage 224. Here, the measure used for scoring the answer candidates is as given by Equation (1).

Meanwhile, question analyzing unit 226 conducts morphological analysis and parsing on the received question, and outputs morphological information and syntactic information.

Evaluating unit 228 evaluates the pieces of information output from question analyzing unit 226, adds tags indicating a range of evaluation phrase and its polarity to the question, and applies the result to feature vector generating unit 232. Semantic class converting unit 230 applies the statistic model for estimating semantic class, represented by Equation (2), to nouns contained in the pieces of information output from question analyzing unit 226, thereby estimates their semantic classes, and converts the nouns to information representing semantic classes. Resulting information with nouns converted are applied to the feature vector generating unit 232.

Based on the question with evaluation tags output from evaluating unit 228, the morphological information and parsing information output from question analyzing unit 226, the information output from semantic class converting unit 230 as well as similar pieces of information assigned in advance to each of the answer candidates stored in answer candidate storage 224, feature vector generating unit 232 finds features such as shown in FIG. 8 for each combination of the question and answer candidate, and generates feature vectors consisting thereof. Feature vector generating unit 232 applies each combination of question and answer candidate to answer ranker unit 234.

Answer ranker unit 234 applies SVMs 176 to the applied combinations and thereby obtains a score representing whether the answer candidate is appropriate as an answer to the question, for each of the combinations. Answer ranker unit 234 sorts the combinations in descending order in accordance with the scores and puts a prescribed number of combinations higher in rank in accordance with the scores, and thereby generates answer list 174. Answer ranker unit 234 returns the thus obtained answer list 174 to service utilizing terminal 166.

[Experiment]

The inventors conducted an experiment to see how much accuracy of answers to non-factoid questions could be improved by the above-described embodiment.

(1) Data

For evaluating the above-described embodiment, a test set was manually created. The test set is formed by question generation and answer validation. It is desirable to create the test set with as many participants as possible. Actually, however, the task was done by a limited number of (four) participants, due to various constraints. In the real world, wider range of questions would be asked and, therefore, the experimental results discussed in the following may be an upper bound of the performance of the above-described embodiment when practically applied.

In the question generation step, from among the documents collected in advance, passages containing at least one of the clue terms described above, such as the RIYUU (reason), GEN'IN (cause) or YOUIN (cause), were extracted. Four participants extracted passages each composed of three consecutive sentences containing a description of reasons of some events and, from the description, a non-factoid question was created for which that description is considered to be a correct answer. As a result, 362 non-factoid questions, the answers of which are contained in the original corpus, were obtained.

In the answer validating step, using the system of the present embodiment, first, top 20 answer candidates were obtained for each question, and all question-answer pairs were checked by hand. Their inter-rater agreement (by Fleiss's Kappa) was 0.611, indicating substantial agreement. Correct answers to each question were determined by majority vote.

Figure 9:
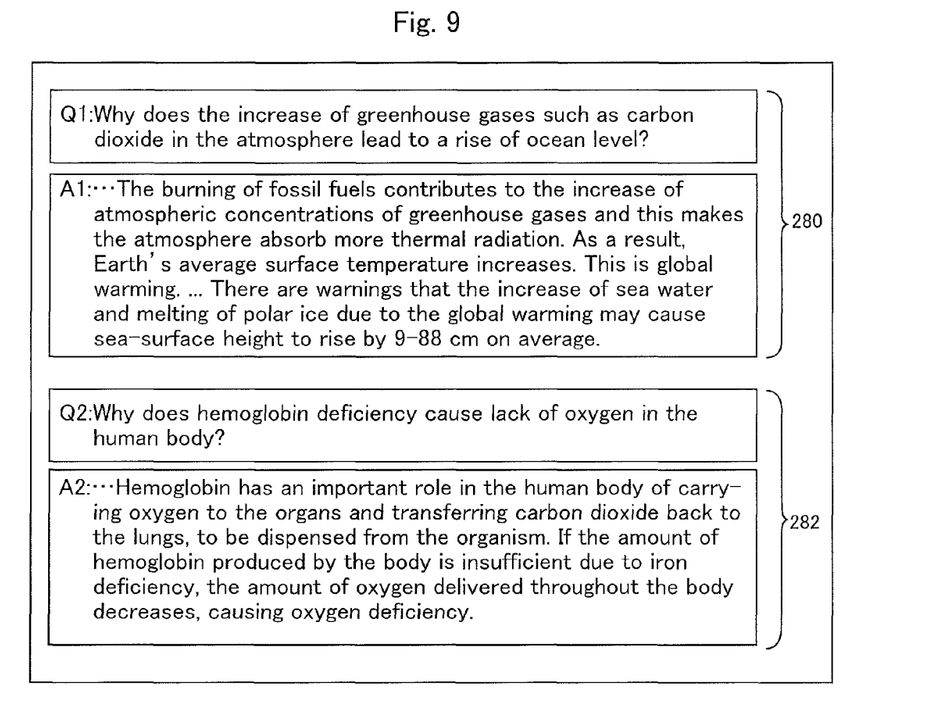
FIG. 9 shows examples of combinations of non-factoid questions and answer candidates thereto.

In the experiment, it was found that the retrieved 20 answer candidates contained a correct answer for only 61.6% of questions (223 of 362). The top 20 answer candidates contained 4.1 correct answers on average. According to the present embodiment, only the top 20 answer candidates can be re-ranked and, therefore, 61.6% is the ceiling of the performance attained by the experiment. FIG. 9 shows samples used in the experiment. FIG. 9 shows a pair of question and answer candidate 280 and another pair of question and answer candidate 282.

(2) Experimental Set-Up

In the experiment, using the test-set described above, systems were evaluated by 10-fold cross validation. For training, TinySVM with a linear kernel (http://chasen.org/~taku/software/TinySVM/) was used. Evaluation was done by P@1 (Precision at top 1) and MAP (Mean Average Precision).

P@1 measures how many questions have a top answer candidate that is correct. MAP measures the overall quality of the top-n answer candidates using Equation (3) below.

[Equation 3]

$$MAP = \frac{1}{|Q|} \sum_{q \in Q} \frac{(Prec(k) \times rel(k))}{|A_q|} \quad (3)$$

Here, Q is a set of non-factoid questions, $A_q$ is a set of correct answers to non-factoid questions $q \in Q$, Prec(k) is the precision at cut-off k in the top n-answer candidates, and rel(k) is an indicator, which is 1 if the item at rank k is a correct answer in $A_q$, and 0 otherwise.

(3) Results

Figure 10:
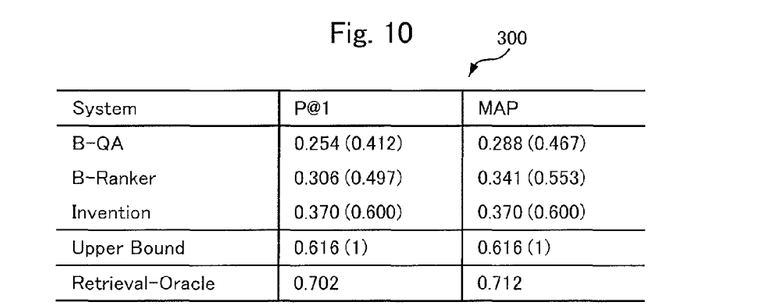
FIG. 10 shows, in the form of a table, experimental results of the question-answering system in accordance with the present invention compared with the performance of a prior art.

FIG. 10 shows the evaluation results of five different systems. In FIG. 10, B-QA represents the system described in Non-Patent Literature 1 implemented by the inventors, which served as the base system. B-Ranker consists of the answer retrieval system B-QA together with the re-ranker using features (MSA) obtained from the morphological information and syntactic information. The system of the present invention is denoted as "Invention", in which all features listed in FIG. 8 are used. The system denoted as "Upper Bound" represents a system that always locates all of n correct answers in top n ranks if there are correct ones in top-20 answer candidates. This indicates the performance upper bound (upper limit) expected in this experiment. The relative performance of each system compared to the upper bound system is shown in parentheses.

In the experiment, a module was also used that adds the source passage used for generating the original question to the first retrieved 20 answer candidates, giving 21 answer candidates. The result for this module is denoted as "Retrieval-Oracle." From the results shown in FIG. 10, it can be seen that the system (Retrieval-Oracle) that initially selects 21 answer candidates (always including a correct answer) utilizing the system of the present invention has high precision of 70.2% in P@1.

FIG. 10 shows that the system of the present invention attains higher precision than the compared two other systems. Particularly, the present invention shows a significant improvement of 11.6% in P@1 over B-QA. The improvement over B-Ranker (6.4% in P@1) shows that the set of features used in the present invention is effective over the conventionally used features. Further, the difference between B-Ranker and B-QA suggests the effectiveness of re-ranking To investigate the contribution of each type of features, various experiments were conducted with different feature sets. In the experiments, MSA was used as the basic feature, and various combinations of MSA and other feature sets are used. Further, a system not using MSA was also subjected the experiment. The results are as shown in FIG. 11.

Figure 11:
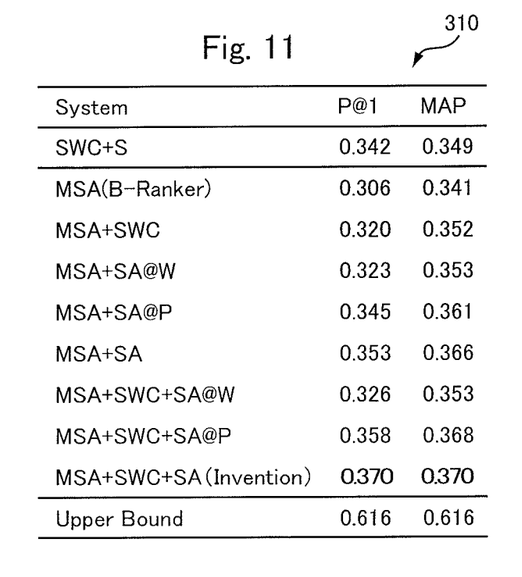
FIG. 11 shows, in the form of a table, performances compared with each other when feature sets used are changed, in the question-answering system in accordance with the present invention.

In FIG. 11, MAS+SWC+SA represents the most preferable embodiment, and MSA represents B-Ranker. SA is split into two groups, that is, SA@W (features expressing words and their polarities) and SA@P (features expressing phrases and their polarities). The performance gap between MSA+SWC+SA and others confirms that all the features contributed to a higher performance. Regarding P@1, the largest improvement was obtained by SA@P as the features concerning phrases and their polarities. Specifically, the performance gap between the present invention and MSA+SWC+SA@W is 4.4%. This fact indicates that the hypothesis underlying the concept of the present invention that "if something undesirable happens, its reason is often something undesirable, and if something desirable happens, its reason is often something desirable as well" is highly plausible.

Effects of the Embodiment

Based on the hypothesis described above, in the present invention, features are selected on the idea that, if evaluation phrases found in a question and evaluation phrases found in answer candidates share the same polarity, then the answer candidate is correct. This resulted in improvement of the precision in retrieving answers. Further, considering that a wide range of questions are possibly asked while the number and scope of training data are limited in training a statistical model used in such evaluation, semantic classes are introduced with reference to the nouns in the question and answer candidates, and from the question and answer candidates with the nouns replaced with semantic classes, features are extracted. Since such features are introduced, a non-factoid question-answering system could be obtained that significantly improves accuracy over conventional non-factoid question-answering system even when the corpus from which answers are retrieved contains huge number of sentences while the training data are limited.

[Computer Implementation]

Figure 12:
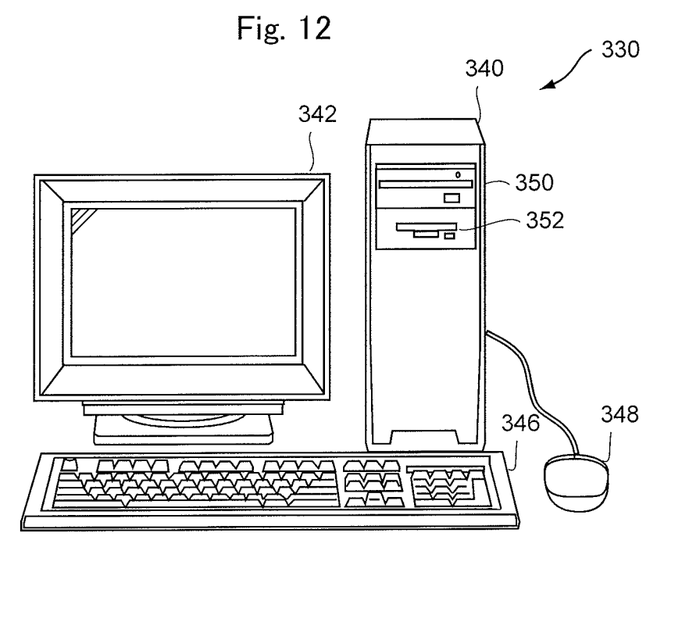
FIG. 12 is a schematic diagram showing an appearance of a computer for implementing the question-answering system in accordance with an embodiment of the present invention.

Of the system in accordance with the present invention, answering unit 170 and training unit 172 are implemented by computer hardware, a program executed by the computer hardware and data stored in the computer hardware. Both units may be implemented in the same computer hardware. FIG. 12 shows an appearance of the computer system 330 and FIG. 13 shows internal configuration of computer system 330.

Referring to FIG. 12, computer system 330 includes a computer 340 having a memory port 352 and a DVD (Digital Versatile Disk) drive 350, a keyboard 346, a mouse 348, and a monitor 342.

Figure 13:
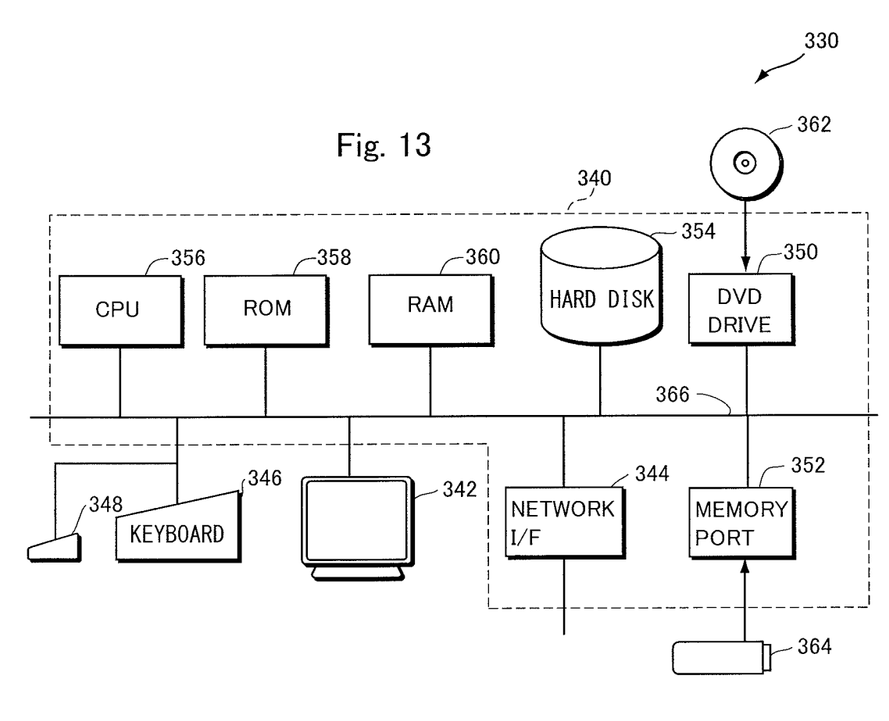
FIG. 13 is a block diagram showing hardware configuration of the computer shown in FIG. 12.

Referring to FIG. 13, computer 340 includes, in addition to memory port 352 and DVD drive 350, a CPU (Central Processing Unit) 356, a bus 366 connected to CPU 356, memory port 352 and DVD drive 350, a read only memory (ROM) 358 storing a boot-up program and the like, and a random access memory (RAM) 360 connected to bus 366, storing program instructions, a system program and work data. Computer system 330 further includes a network interface (I/F) 344 providing connection to a network allowing communication with another terminal.

The computer program causing computer system 330 to operate as the non-factoid question-answering system is stored in a DVD 362 or a removable memory 364 loaded to DVD drive 350 or to memory port 352, and transferred to hard disk 354. Alternatively, the program may be transmitted to computer 340 through a network, not shown, to computer 340 and stored in hard disk 354. At the time of execution, the program is loaded to RAM 360. The program may be directly loaded from DVD 362, removable memory 364 or through network IF 344 to RAM 360.

The program includes a plurality of instructions to cause computer 340 to operate as the non-factoid question-answering system in accordance with the present invention. Some of the basic functions necessary to realize the operation are provided by the operating system (OS) running on computer 340, by a third party program, or by a module of various programming tool kits installed in computer 340. Therefore, the program may not necessarily include all of the functions necessary to realize the system and method of the present embodiment. The program have only to include instructions to execute the operation of the above-described non-factoid question-answering system by calling appropriate functions or appropriate program tools in a program tool kit in a manner controlled to attain desired results. The operation of computer system 330 is well known and, therefore, description thereof will not be given here.

In the embodiment above, it is assumed that a question is transmitted in text from a service utilizing terminal, and the answer is also returned in text. The present invention, however, is not limited to such an embodiment. For example, the invention is also applicable to a speech based question answering system. In that case, service utilizing terminal 166 shown in FIG. 5 may be a portable telephone, and prior to candidate retrieving unit 222 and question analyzing unit 226, voice signals of a question received from service utilizing terminal 166 may be subjected to voice recognition to convert the question to texts. Here, as the output of answer ranker unit 234, answer list 174 may be returned in the form of a web page to service utilizing terminal 166, or the output may be returned as a speech to service utilizing terminal 166 by voice synthesis based on the answer of the highest score.

The embodiment above is directed to Japanese. Application of the present invention, however, is not limited to Japanese. The present invention is applicable to any language provided that training data thereof can be formed and sufficiently large number of computer-readable sentences can be collected.

Further, in the embodiment above, it is assumed that sentences stored in corpus storage 178 are subjected to the same processes as those executed by question analyzing unit 226, evaluating unit 228 and semantic class converting unit 230 and the results of these processes are stored in association with the sentences. This approach can reduce the time necessary for feature vector generating unit 232 to generate features. The present invention, however, is not limited to such an embodiment. Specifically, only the information necessary for candidate retrieving unit 222 to retrieve candidates may be assigned to the documents stored in corpus storage 178, and when the feature vectors are generated by feature vector generating unit 232, processes necessary for generating features (processes similar to those executed by question analyzing unit 226, evaluating unit 228 and semantic class converting unit 230) may be performed on each of the selected candidates.

Further, in the embodiment above, when answer candidates are retrieved by candidate retrieving unit 222, sentences containing vocabularies similar to those contained in the question are searched, based mainly on document frequency and frequency of occurrence of a term in the documents. The present invention, however, is not limited to such an embodiment. Any reference that is believed to enable extraction of sentences as possible answers to the question may be used.

In the embodiment above, objects are classified to two evaluation classes having opposite evaluations. The present invention, however, is not limited to such an embodiment. The evaluation classes may be a plurality of classes with a prescribed order, and the objects may be classified to any of the plurality of evaluation classes. Further, two or more references for evaluation may be provided and the objects may be classified to a plurality of evaluation classes using the two or more references.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention is applicable to the field of manufacturing, utilizing and leasing question-answering systems related to why- or how-questions utilizing natural language processing allowing further improvement of accuracy.

REFERENCE SIGNS LIST 30 question-answering system
40, 170 answering unit
44, 166 service utilizing terminal
46, 176 SVMs
48, 178 corpus storage
50, 174 answer list
60, 190 QA sentences storage
62, 198 training data generating unit
64, 200 training data storage
66 training unit
82, 222 candidate retrieving unit
84, 224 answer candidate storage
86, 226 question analyzing unit
88, 232 feature vector generating unit
90, 234 answer ranker unit
160 non-factoid question-answering system
192 QA sentence analyzing unit
194, 228 evaluating unit
196, 230 semantic class converting unit

The invention claimed is:

1. A non-factoid question-answering system, receiving an input of a non-factoid question and generating an answer to the question, to be connected to a non-transitory computer readable medium storing a corpus composed of computer-readable documents of a language as an object of processing, comprising:

a processor configured to:

in response to an input of a question, search and extract a plurality of answer candidates to the question from said corpus and generate prescribed features from combinations of the question and each of the plurality of answer candidates;

calculate, for each of the combination of the question and each of the answer candidates, a score indicating a degree of the answer candidate in the combination being a correct answer to the question in the combination; and output, based on the calculated scores for each of the combinations, an answer candidate having the highest probability of being a correct answer to the question;

wherein each of the plurality of answer candidates has assigned thereto information necessary for generating said features;

wherein generating said prescribed features includes:

performing morphological analysis and parsing on said question and outputting morphological information and syntactic information, specifying, from said question, a phrase classified to a first evaluation class and a phrase classified to a second evaluation class, in accordance with a certain evaluation reference, said first and second evaluation classes having assigned thereto mutually opposite evaluation polarities, and generating said prescribed features from the combinations of said question and each of said plurality of answer candidates based on the result of the morphological analysis and parsing, locations of phrases specified and their evaluation class polarities, and the information for generating features assigned to said answer candidate.

2. The non-factoid question-answering system according to claim 1, wherein the generating of the prescribed features further includes classifying each noun included in the output from said morphological analysis and said parsing to any of a plurality of semantic word classes prepared in advance, and converting the noun to its corresponding semantic class; and generating said features from the combinations of said question and each of said plurality of answer candidates based on the result of said morphological analysis and said parsing, locations of said phrases specified and their evaluation class polarities, said output of said morphological analysis and said parsing after converting each noun included in the output to its corresponding semantic class, and the information for generating features assigned to said answer candidate.

3. The non-factoid question-answering system according to claim 2, wherein the feature generated based on the locations of the specified phrases and their evaluation class polarities includes information indicating whether or not the evaluation class polarity of a phrase in the question agrees with the evaluation class polarity of a phrase in the answer candidate.

4. The non-factoid question-answering system according to claim 2, wherein the feature generated includes a feature obtained from the outputted morphological information and syntactic information not using the phrase classified to the first evaluation class and the phrase classified to the second evaluation class or the classification of each noun included in the outfit from said morphological analysis and parsing, a feature obtained by combining the outputted morphological information and syntactic information with the phrase classified to the first evaluation class and the phrase classified to the second evaluation class, and a feature obtained by combining the outputted morphological information and syntactic information with the semantic class of each noun included in the output from said morphological analysis and parsing.

5. The non-factoid question-answering system according to claim 2, wherein the feature generated includes a feature obtained by combining the outputted morphological information and syntactic information with the phrase classified to the first evaluation class and the phrase classified to the second evaluation class, and further with the classification of each noun included in the output from said morphological analysis and parsing.

6. A computer program realizing, by a computer including a processor, a non-factoid question-answering system, receiving an input of a non-factoid question and generating an answer to the question;

said computer is connected to a non-transitory computer readable medium for storing a corpus composed of computer-readable documents of a language as an object of processing;

said computer program causing said processor to:

in response to an input of a question, search and extract a plurality of answer candidates to the question from said corpus and generate prescribed features from combinations of the question and each of the plurality of answer candidates;

calculate, for each of the combination of the question and each of the answer candidates, a score indicating a degree of the answer candidate in the combination being a correct answer to the question in the combination; and output, based on the calculated scores for each of the combinations, an answer candidate having the highest probability of being a correct answer to the question;

wherein each of the plurality of answer candidates has assigned thereto information necessary for generating said features;

wherein generating said prescribed features includes:

performing morphological analysis and parsing on said question and outputting morphological information and syntactic information, specifying, from said question, a phrase classified to a first evaluation class and a phrase classified to a second evaluation class, in accordance with a certain evaluation reference, said first and second evaluation classes having assigned thereto mutually opposite evaluation polarities, and generating said prescribed features from the combinations of said question and each of said plurality of answer candidates based on the result of the morphological analysis and parsing, locations of phrases specified and their evaluation class polarities, and the information for generating features assigned to said answer candidate.

* * * * *